(12) United States Patent
Moravec et al.

(10) Patent No.: US 6,786,215 B1
(45) Date of Patent: Sep. 7, 2004

(54) DEEP FAT FRYER WITH BURNER TUBE END WELD HEAT SHIELDING

(75) Inventors: Donald W. Moravec, Oak Park, IL (US); Joseph V. Moravec, Downers Grove, IL (US)

(73) Assignee: Keating of Chicago, Inc, Bellwood, IL (US)

( * ) Notice: Subject to any disclaimer, the term of this patent is extended or adjusted under 35 U.S.C. 154(b) by 0 days.

(21) Appl. No.: 10/437,818

(22) Filed: May 14, 2003

(51) Int. Cl.[7] .............................. A47J 27/00; A47J 37/12
(52) U.S. Cl. ........................... 126/391.1; 126/378.1; 99/330; 99/403; 99/447
(58) Field of Search ........................... 126/391.1, 41 R, 126/91 R, 299 E, 375.1, 390.1, 378.1; 99/330, 401, 403, 407, 447; 431/326, 328

(56) References Cited

U.S. PATENT DOCUMENTS 5,778,871 A * 7/1998 Herring .................... 126/391.1

* cited by examiner

*Primary Examiner*—Jiping Lu
(74) *Attorney, Agent, or Firm*—Nicholas A. Camasto

(57) ABSTRACT

A fry pot includes a burner tube that is secured to the walls of the fry pot with front and rear end welds. A front end weld shield consists of a stainless steel clad first molded ceramic positioned between the gas burner and the front of the burner tube and a rear end weld shield consists of a second molded ceramic having a brim shaped portion positioned in the rear of the burner tube. Both end weld shields have grooves within which the respective end welds are received.

9 Claims, 2 Drawing Sheets

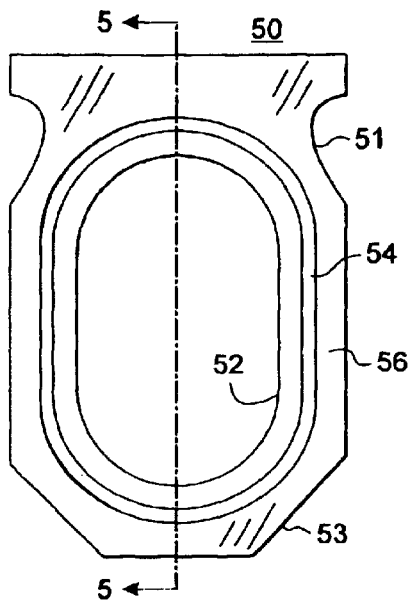
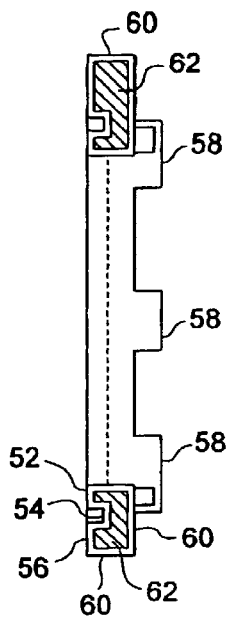
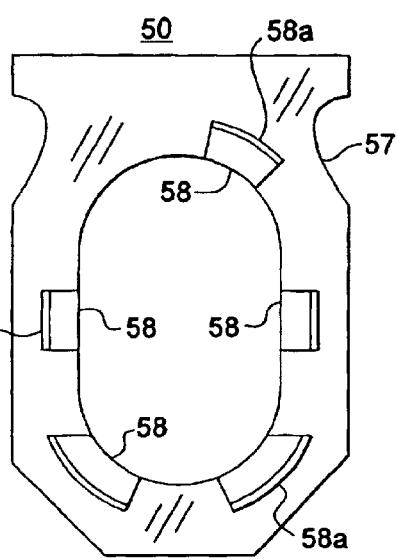
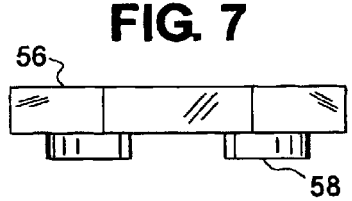
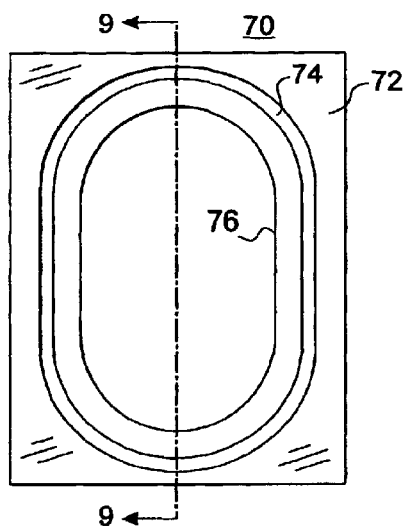
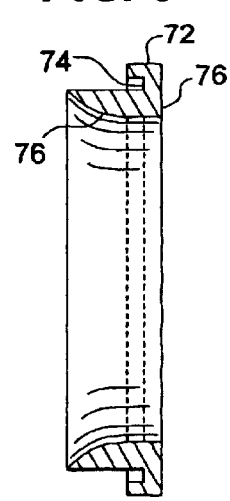
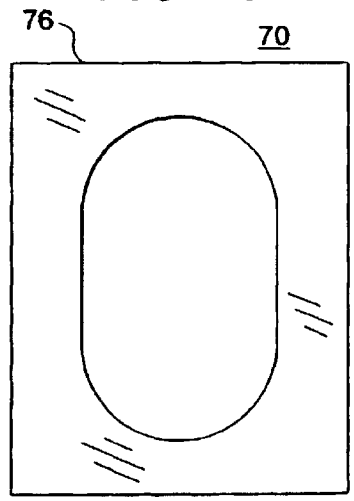

DEEP FAT FRYER WITH BURNER TUBE END WELD HEAT SHIELDING

BACKGROUND OF THE INVENTION AND PRIOR ART

This invention relates in general to deep fat fryers and specifically to arrangements for precluding temperature induced failures of the end welded junctions of the fry pot and burner tubes in such fryers. Deep fat fryers include a fry pot having one or more burner tubes that are secured in corresponding flared openings in opposed first and second walls therein, by edge welding their ends. The fry pot and burner tube are fabricated from stainless steel. The edge welding of the burner tubes and fry pot walls are herein referred to as end welds In high heat or rapid recovery type deep fat fryers, the burner flame is intense. Under some conditions of use, the end welds on the burner tubes may reach very high temperatures, occasionally producing excessive stresses in the end welds that result in weld failure. One reason for the very high temperature rise is that the end welds are not fully exposed to the cooling effect of the cooking oil in the fry pot.

In U.S. Pat. No. 5,778,871, assigned to Keating of Chicago, Inc., front and rear heat shields are used to deflect heat away from the burner tube end welds. The front heat shield consists of a pair of welded, opposed flat stainless steel plates having outwardly flared openings in alignment with the front edges of the burner tubes. The smaller of the flared openings extends into the inlet of the burner end tube and shields the end weld from the burner flame. The edge of the opting does not contact the burner tube, however, and the circumferential gap between the edge of the opening and the burner tube enables air to flow over the end weld, thus contributing a cooling effect. The larger flanged opening abuts the flame-generating burner. The rear heat shield comprises another stainless steel plate that supports stainless steel tubes with lips or flared brims positioned in the outlets of the burner tubes, with suitable insulating material being placed between the burner tubes and the flared brim. This patented arrangement is partially illustrated in FIG. 3.

While satisfactorily protecting the end welds, the described patented solution is relatively costly to implement and undesirably shields a portion of the gas jets in the burner face, creating thermal inefficiencies. With the novel heat shields disclosed in the present invention, the end welds are protected in a much less costly manner and the gas burner face is unobstructed.

OBJECTS OF THE INVENTION

A principal object of the invention is to provide an improved deep fat fryer.

Another object of the invention is to provide a deep fat fryer that is less costly to manufacture.

A further object of the invention is to provide a deep fat fryer of improved reliability and efficiency.

A feature of the invention is the provision of improved front and rear heat shields for deep fat fryer burner tube end welds.

BRIEF DESCRIPTION OF THE DRAWINGS

These and other objects, features and advantages of the invention will become apparent upon reading the following description in conjunction with the drawings, in which:

FIG. 4 shows the burner tube side of the front end weld shield of the invention;

FIG. 5 is a cross section taken along line 5—5 of FIG. 4;

FIG. 6 shows the gas burner side of the front end weld shield;

FIG. 7 is a bottom view of the front end weld shield of FIG. 4;

FIG. 8 shows the burner tube side of the rear end weld shield of the invention;

FIG. 9 is a cross section taken along line 9—9 of FIG. 8;

FIG. 10 shows the flue side of the rear end weld shield; and

DESCRIPTION OF THE PREFERRED EMBODIMENT

Figure 1:
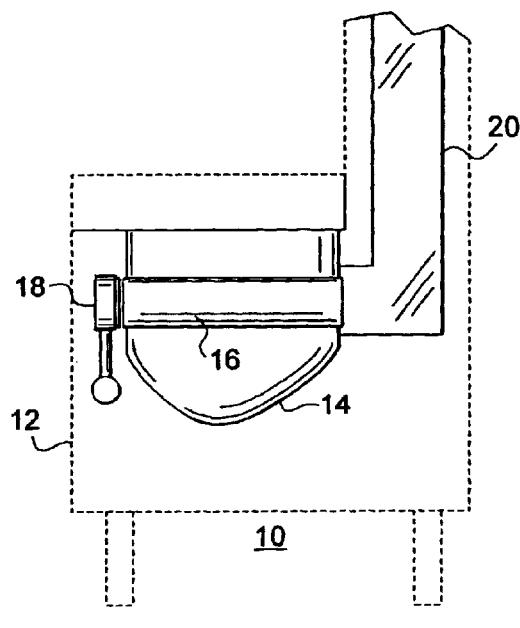
FIG. 1 is a simplified partial side view of a prior art deep fat fryer.
Figure 2:
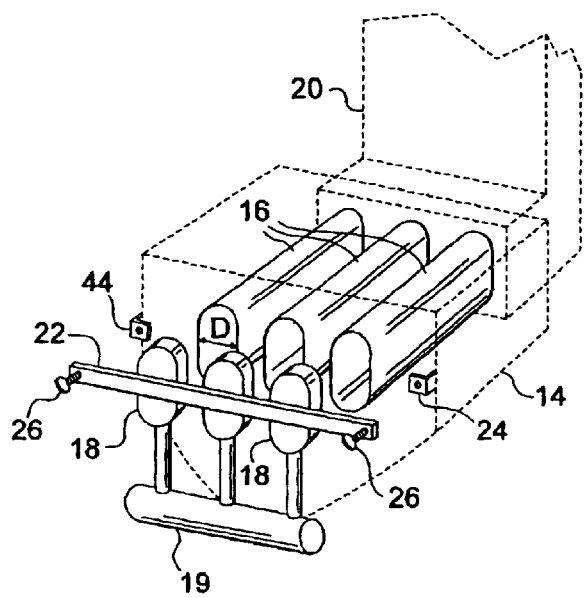
FIG. 2 is an exploded partial perspective of the gas burner, fry pot and flue in FIG. 1.

The prior art depictions of FIGS. 1 and 2 show, in simplified form, the basic configuration of a three burner tube deep fat fryer 10. A cabinet 12 houses a fry pot 14 that includes three tubular burner tubes 16 and three corresponding gas burners 18. Burner tubes 16 are oblong shaped with a distance D being the smaller dimension of the oblong. Flame from a gas burner 18 passes through a respective burner tube 16 and combustion products exit from a flue 20 that communicates with all of the burner tubes. The gas burners 18 are supplied from a gas is manifold 19 and maintained in fixed relationship to burner tubes 16 by a support bar 22 that may be secured by screws 26, or the like, to suitable brackets 24 that are affixed to fry pot 14. The structure should be understood to be representative of deep fat fryer, which vary in size, number of burners and burner tubes.

Figure 3:
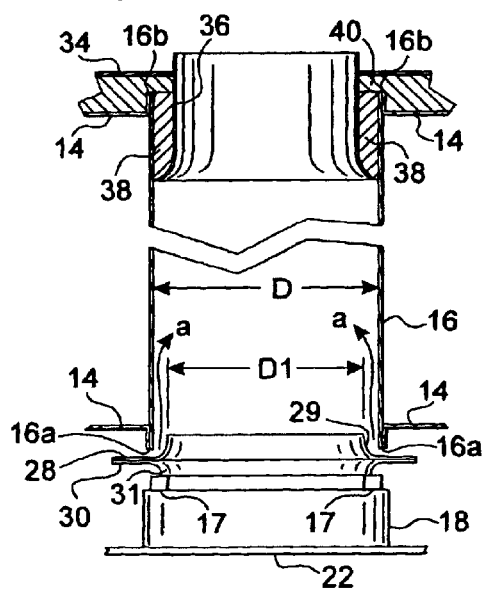
FIG. 3 is a partial, broken away top view showing the configuration and positioning of the above-mentioned patented prior art burner end weld heat shields.

As illustrated in FIG. 3, each burner tube 16 has a front end weld 16a and a rear end weld 16b securing it to a pair of opposed walls of fry pot 14. The end weld shields are those shown and claimed in the above identified United States Patent. The front, or burner inlet end weld shield, is a welded configuration of two stainless steel plates 28 and 30 having opposed outwardly flared openings 29 and 31 (generally corresponding in shape to the end of the burner tube) and is secured in position between gas burner 18 and a wall of fry pot 14. For a three-burner tube installation, three sets of outwardly flared openings are provided The gas burner 18 includes a plurality of spacing lugs 17 around its periphery for alignment and for maintaining an air space between the gas jets (not shown) formed in the face of gas burner 18 and the opening 31. As is well-known, this air space is critical to the proper functioning of the gas burner. The front end weld shield precludes flame from gas burner 18 from impinging on end weld 16a, thus protecting end weld 16a from excessive temperature buildup. While effective, the arrangement is somewhat costly and flared opening 29 partially obstructs some of the outer gas jets on the face of the burner, which negatively impacts efficiency. As mentioned above, flared opening 29 does not contact burner tube 16 and the gap enables air to flow over and help cool end weld 16a. This is illustrated by the arrows "a" which represent air flow around flared opening 29. The arrangement defines a distance D1, less than distance D (FIG. 2) which is an indication of the degree of obstruction of the face of gas burner 18, which is of standard design.

The end weld stainless steel shield at the rear of burner tube 16 comprises a brim-shaped heat deflecting tube 36 that is welded to a stainless steel sheet 34 with appropriately located openings and secured to an opposed wall of fry pot 14 by suitable means. (It should be understood that deflecting tube 36 exits into flue 20 of the fryer.) Insulation 40 is included between plate 34 and the wall of fry pot 14 and insulation 38 is included between the outer edges of deflecting tube 36 and the inner surface of the rear of burner tube 16. The configuration of deflecting tube 36 and insulation 38 shields end weld 16b from hot combustion products flowing in burner tube 16. Similarly, insulation 40 keeps the hot flue gases from directly impinging on end weld 16b.

Figure 11:
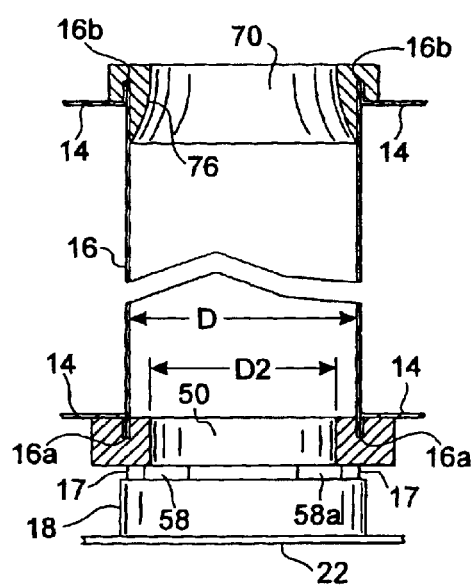
FIG. 11 is a partial, broken away top view illustrating the configuration and positioning of the burner end weld shields of the invention.

The present invention provides novel end weld shields that are less costly and that minimizes efficiency loss in the deep fat fryer. FIGS. 4–7 illustrate various views of the front or inlet end weld shield 50 which is generally rectangular except for sections 51 and 53 that provide clearance for apparatus, such as limit thermocouples and control thermostats (not shown), that are secured to the fry pot wall. A groove 54 is formed in the face 56 of front end weld shield 50 for receiving front end weld 16a of burner tube 16 (FIG. 11). The rear 57 of front end weld shield 50 has a plurality of abutments 58 for engaging the lugs 17 of gas burner 18 to both position gas burner 18 with respect to burner tube 16 and to maintain the appropriate air space when gas burner 18 is secured to the fry pot.

Front end weld shield 50 is a laminated insular shield consisting of thin overlapping pieces of stainless steel that encapsulate a molded ceramic. The stainless steel pieces are formed, with the desired configuration, and welded together after assembly over the molded ceramic. The abutments 58 are channel shaped pieces of stainless steel that are welded at various places to the back of front end weld shield 50. The welds are made along extensions 58a of abutments 58 and is along the inner and outer edges of front end weld shield 50. It will be appreciated that the shield may be fabricated in other ways, such as by forming the two stainless steel pieces to tightly nest over the molded ceramic (eliminating the peripheral welding) and with the back piece having suitable abutments formed therein (eliminating the abutment welding). The invention defines an end weld shield in the form of a metal clad insulator for producing a rugged, heat resistant shield for the inlet edge weld of the burner tube. The insulating material used in the molded ceramic of the preferred embodiment of the invention is the trademarked BTU-Block Board 1807/18 from Thermal Ceramics (www.thermalceramics.com). in FIGS. 8–10, burner tube rear end weld shield 70 of the invention is shown. The rear end weld shield 70 is generally rectangular and includes a flared brim 76 that fits within the open end of the rear of burner tube 16, with the burner tube end weld being received in a groove 74 in rear end weld shield 70. The back surface 76 of rear end weld shield 70 is plain. The molded ceramic material is of the aluminosilicate family and is available under the trade name CF300W from Joy-Mark, Inc. of Cudahy, Wis.

FIG. 11 illustrates the front and rear end weld shields of the invention fitted to burner tube 16. In particular, it should be noted that burner front end weld shield 50 defines a distance D2 that is less than distance D1 in prior art FIG 3. With the shield of the present invention, none of the jets in the face of standard gas burner 18 are obstructed and efficiency is not impaired. The shield surface 56 and the abutments 58 of front end weld shield 50 also provide substantial contact with the lugs 17 of gas burner 18 to consistently and accurately position gas burner 18 with respect to burner tube 16. The flare 76 and the end weld receiving groove 74 in the molded ceramic rear end weld shield 70 effectively isolates burner end weld shield 16b from the hot combustion products in the burner tube in a very cost-effective manner. The rear end weld shield (shields) is securely held in position by a strap arrangement (not shown) similar strap 22 in FIG. 2.

What has been described is a deep fat fryer with novel burner tube end weld shields in the form of a metal clad molded ceramic front end weld shield and a molded ceramic brim shaped rear end weld shield. It is recognized that numerous changes to the described embodiment of the invention will be apparent to those skilled in the art without departing from its true spirit and scope. The invention is to be limited only as defined in the claims.

What is claimed is:

1. A deep fat fryer comprising:
   a fry pot having a first wall;
   a burner tube secured in said first wall by a front end weld;
   a gas burner mounted adjacent to the front of said burner tube for projecting a flame into said burner tube during operation of said gas burner; and
   a laminated insular front shield interposed between said gas burner and said front end weld for restricting the temperature rise of said front end weld during operation of said gas burner, said laminated insular front shield comprising a first molded ceramic confided to match the contour of said front end weld and a metal overlay surrounding said first molded ceramic.

2. The fryer of claim 1, wherein said laminated insular front shield includes a groove receiving said front end weld and further including:
   a plurality of abutments on said laminated insular front shield for spacing said burner tube to maintain a gap for air flow into said burner tube.

3. The fryer of claim 2, wherein:
   said first molded ceramic has a thickness of about 0.375 inch and a thermal conductivity less than that of still air; and
   wherein said metal overlay is stainless steel having a thickness of about 0.008 inches.

4. The fryer of claim 1, further including:
   a flue for exhausting combustion products from said burner tube;
   a rear end weld securing said burner tube to a second, opposed wall of said fry pot; and
   an insulating rear shield between said burner tube and said flue.

5. The fryer of claim 4, wherein:
   said laminated insular front shield is configured to match the contour of said front end weld and comprises a first molded ceramic surrounded by a metal overlay; and
   said insulating rear shield comprises a second molded ceramic configured to match the contour of said rear end weld.

6. The fryer of claim 5, wherein said front shield and said rear shield each include a groove for receiving said front end weld and said rear end weld, respectively.

7. The fryer of claim 6, wherein;
   said first molded ceramic has a thickness of about 0.375 inch and a thermal conductivity less than that of still air;

said metal overlay is stainless steel having a thickness of about 0.008 inches; and said second molded ceramic having a brim shaped inner portion extending into the rear of said burner tube.

8. A deep fat fryer comprising:

a fry pot having a first wall and an opposed second wall;

a burner tube secured in said first wall by a front end weld and to said second wall by a rear end weld;

a flue for exhausting combustion products from said burner tube;

a gas burner mounted adjacent to the front of said burner tube for projecting a flame into said burner tube during operation of said gas burner;

a laminated insular front shield interposed between said gas burner and said front end weld for restricting the temperature rise of said front end weld during operation of said gas burner, said laminated insular front shield comprising a first molded ceramic surrounded by a metal overlay and including a groove for receiving said first end weld; and an insulating rear shield between said burner tube and said flue.

9. The fryer of claim 8, wherein said insulating rear shield comprises a second molded ceramic having a brim shaped inner portion extending into the rear of said burner tube.

* * * * *